(12) United States Patent
Seletskiy et al.

(10) Patent No.: US 12,273,385 B2
(45) Date of Patent: Apr. 8, 2025

(54) SYSTEMS AND METHODS FOR AUTOMATED MALICIOUS CODE REPLACEMENT

(71) Applicant: Cloud Linux Software Inc., Estero, FL (US)

(72) Inventors: Igor Seletskiy, Palo Alto, CA (US); Andrey Kucherov, Tula (RU)

(73) Assignee: Cloud Linux Software Inc., Estero, FL (US)

( * ) Notice: Subject to any disclaimer, the term of this patent is extended or adjusted under 35 U.S.C. 154(b) by 491 days.

(21) Appl. No.: 17/582,369

(22) Filed: Jan. 24, 2022

(65) Prior Publication Data

US 2023/0239323 A1 Jul. 27, 2023

(51) Int. Cl.
*H04L 9/40* (2022.01)

(52) U.S. Cl.
CPC ...... *H04L 63/1491* (2013.01); *H04L 63/1416* (2013.01); *H04L 63/1466* (2013.01)

(58) Field of Classification Search
CPC ............... H04L 63/1416; H04L 63/145; H04L 63/1466; H04L 63/1491
See application file for complete search history.

(56) References Cited

U.S. PATENT DOCUMENTS

| | | | | |
|---|---|---|---|---|
| 8,019,709 | B2 * | 9/2011 | Norton | G06N 5/025 706/45 |
| 8,661,549 | B2 * | 2/2014 | Chevallier-Mames | G06F 21/10 726/22 |
| 9,501,639 | B2 * | 11/2016 | Stolfo | G06F 21/566 |
| 9,626,359 | B1 * | 4/2017 | Sun | G06F 21/125 |
| 9,652,617 | B1 * | 5/2017 | Evans | G06F 21/57 |
| 9,858,440 | B1 * | 1/2018 | Wang | G06F 21/64 |
| 10,084,813 | B2 * | 9/2018 | Eyada | H04L 63/1416 |
| 10,152,591 | B2 * | 12/2018 | Tolpin | G06F 21/564 |
| 10,268,601 | B2 * | 4/2019 | Okhravi | G06F 21/52 |
| 10,298,599 | B1 * | 5/2019 | Zhang | H04L 63/1416 |

(Continued)

OTHER PUBLICATIONS

Perkins et al., Comprehensive Java Metadata Tracking for Attack Detection and Repair in pp. 39-49 of 50th Annual IEEE/IFIP International Conference on Dependable Systems and Networks (DSN) (Year: 2020).*

(Continued)

*Primary Examiner* — Sharon S Lynch
(74) *Attorney, Agent, or Firm* — ArentFox Schiff LLP; Michael Fainberg

(57) ABSTRACT

Disclosed herein are systems and method for automated malicious code replacement. In one exemplary aspect, a method may comprise scanning for malicious content in a file comprising a script written in an interpretable programming language, wherein the malicious content triggers malicious activity on a computing device that stores the file. The method may comprise detecting a malware injection in the file based on the scanning, wherein the malware injection comprises at least one operator that enables the malicious activity. The method may comprise identifying a benign operator that can replace the at least one operator to prevent execution of the malicious activity without causing a syntax error. The method may comprise updating the file by replacing the at least one operator with the benign operator.

19 Claims, 4 Drawing Sheets

(56) References Cited

U.S. PATENT DOCUMENTS

| | | | | |
|---|---|---|---|---|
| 10,757,134 B1* | 8/2020 | Eyada | G06F 21/55 |
| 10,762,200 B1* | 9/2020 | Salem | G06F 21/566 |
| 10,834,101 B2* | 11/2020 | Ficarra | G06F 21/14 |
| 10,868,819 B2* | 12/2020 | Zhang | H04L 63/1416 |
| 11,044,268 B2* | 6/2021 | Pastore | G06F 21/554 |
| 11,210,392 B2* | 12/2021 | Salem | G06F 21/564 |
| 11,314,862 B2* | 4/2022 | Sawhney | G06F 21/554 |
| 11,507,269 B2* | 11/2022 | Jia | G06F 21/84 |
| 11,641,375 B2* | 5/2023 | Kras | H04L 63/1408 726/24 |
| 11,783,035 B2* | 10/2023 | Kutt | G06F 8/42 726/23 |
| 11,816,214 B2* | 11/2023 | Kutt | G06F 8/42 |
| 2009/0125459 A1* | 5/2009 | Norton | G06N 5/025 706/10 |
| 2009/0126020 A1* | 5/2009 | Norton | G06N 5/025 709/201 |
| 2011/0067108 A1* | 3/2011 | Hoglund | G06F 21/554 706/47 |
| 2012/0221494 A1* | 8/2012 | Pasetto | G06N 5/00 706/12 |
| 2013/0232578 A1* | 9/2013 | Chevallier-Mames | G11B 20/00086 726/26 |
| 2015/0372980 A1* | 12/2015 | Eyada | G06F 21/55 726/1 |
| 2016/0012222 A1* | 1/2016 | Stolfo | H04L 63/1466 726/23 |
| 2016/0088015 A1* | 3/2016 | Sivan | H04L 63/1416 726/23 |
| 2016/0142428 A1* | 5/2016 | Pastore | H04L 63/1466 726/23 |
| 2016/0191554 A1* | 6/2016 | Kaminsky | H04L 63/1425 726/23 |
| 2017/0032120 A1* | 2/2017 | Tolpin | G06F 21/53 |
| 2017/0149804 A1* | 5/2017 | Kolbitsch | H04L 63/1416 |
| 2017/0171170 A1* | 6/2017 | Sun | H04L 9/088 |
| 2017/0185783 A1* | 6/2017 | Brucker | G06F 21/577 |
| 2017/0244713 A1* | 8/2017 | Sun | G06F 21/125 |
| 2017/0264623 A1* | 9/2017 | Ficarra | G06F 9/455 |
| 2017/0324772 A1* | 11/2017 | Pastore | H04L 63/1416 |
| 2017/0364452 A1* | 12/2017 | Okhravi | G06F 11/1048 |
| 2018/0121680 A1* | 5/2018 | Wang | G06F 21/55 |
| 2018/0300480 A1* | 10/2018 | Sawhney | G06F 21/563 |
| 2019/0268359 A1* | 8/2019 | Zhang | H04L 67/01 |
| 2020/0034489 A1* | 1/2020 | Liu | H04L 63/0209 |
| 2020/0366694 A1* | 11/2020 | Kolbitsch | H04L 63/1416 |
| 2020/0372150 A1* | 11/2020 | Salem | G06F 21/566 |
| 2021/0157906 A1* | 5/2021 | Shaon | G06F 21/54 |
| 2021/0326035 A1* | 10/2021 | Jia | G06N 20/00 |
| 2021/0344713 A1* | 11/2021 | Kras | H04L 51/18 |
| 2022/0019659 A1* | 1/2022 | Salem | G06F 21/577 |
| 2023/0247052 A1* | 8/2023 | Kras | H04L 51/046 726/24 |

OTHER PUBLICATIONS

Hamlet et al., Targeted Modification of Hardware Trojans, 189-197 in Journal of Hardware and Systems Security (Year: 2019).*
Li et al., Adversarial Hardware With Functional and Topological Camouflage in 1685-1689 in IEEE Transactions on Circuits and Systems—II: Express Briefs, vol. 68, No. 5, May 2021 (Year: 2021).*

* cited by examiner

SYSTEMS AND METHODS FOR AUTOMATED MALICIOUS CODE REPLACEMENT

FIELD OF TECHNOLOGY

The present disclosure relates to the field of data security, and, more specifically, to systems and methods for automated malicious code replacement.

BACKGROUND

Modern data security systems need to constantly adapt in order to combat evolving cyberattacks. Such cyberattacks may be varied in nature. For example, in one type of cyberattack, a number of files may be uploaded to a victim's systems such as web shells, backdoors, spam mailers, etc. While one approach to combat such uploads is to delete the uploaded files, removal options are not always viable. For instance, another type of cyberattack is a malicious code injection, where malicious code may be injected into an ".htaccess" file to cause mobile redirections, or PHP/Perl script injections may be used to create backdoors, or malvertising scripts may be injected into static .js (JavaScript) and .html files. In some cases, an injection into an existing file may be accompanied by the uploading of a command and a control script. For example, malicious code may be injected into the exif-header of a .jpg file, and the code may be triggered and executed by a different uploaded file.

Depending on the importance of the file that has been injected and its dependencies, simply removing the file may cause further damage to the system. Moreover, malicious code injections are very often complex to remove because of their constantly changing structure and syntax.

SUMMARY

To address these issues, the present disclosure describes transforming a malicious code injection into a benign fragment instead of removal. Accordingly, aspects of the disclosure describe methods and systems for automated malicious code replacement.

In one exemplary aspect, a method may comprise scanning for malicious content in a file comprising a script written in an interpretable programming language, wherein the malicious content triggers malicious activity on a computing device that stores the file. The method may comprise detecting a malware injection in the file based on the scanning, wherein the malware injection comprises at least one operator that enables the malicious activity. The method may comprise identifying a benign operator that can replace the at least one operator to prevent execution of the malicious activity without causing a syntax error. The method may comprise updating the file by replacing the at least one operator with the benign operator.

In some aspects, the method may comprise identifying the benign operator by selecting an operator as the benign operator that (1) accepts arguments of a same type as arguments accepted by the at least one operator, (2) can be placed in a portion of the script where the at least one operator is placed, and (3) does not produce $3^{rd}$-party code execution.

In some aspects, the method may comprise identifying the benign operator by searching a template database for a template of the malware injection detected in the file, wherein the template is a pattern comprising a sequence of operators and delimiters, and wherein the template database maps each malware injection template to benign code comprising replacement operators for the malware injection template. The method may further comprise identifying the template of the malware injection in the template database, and selecting an associated replacement operator of the template as the benign operator.

In some aspects, the method may comprise selecting the benign operator based on a rule of a plurality of rules that indicate replacement operators of dangerous operators, wherein the at least one operator is a dangerous operator.

In some aspects, the method may comprise selecting, from the at least one operator, a main operator that triggers the malware injection, wherein the benign operator replaces the main operator.

In some aspects, selecting the main operator comprises executing a machine learning algorithm that is trained to detect main operators of malware injections inside scripts and replace the main operators with replacement operators, wherein a training dataset for the machine learning algorithm comprises a plurality of scripts with labelled injections and successful replacement code for the labelled injections.

In some aspects, the at least one operator comprises a first operator that triggers the malicious activity and a second operator that informs an attacker that the malicious activity was successfully triggered. In some aspects, updating the file comprises generating a honeypot by replacing the first operator with the benign operator and not replacing the second operator.

In some aspects, the method may comprise monitoring interactions of the attacker with the honeypot and logging, in memory, information about the interactions based on the monitoring, wherein the information comprises incoming requests, outgoing responses, and network parameters.

In some aspects, the method may comprise detecting an IP address of the attacker based on the monitoring, and recording the IP address in a blacklist.

It should be noted that the methods described above may be implemented in a system comprising a hardware processor. Alternatively, the methods may be implemented using computer executable instructions of a non-transitory computer readable medium.

The above simplified summary of example aspects serves to provide a basic understanding of the present disclosure. This summary is not an extensive overview of all contemplated aspects, and is intended to neither identify key or critical elements of all aspects nor delineate the scope of any or all aspects of the present disclosure. Its sole purpose is to present one or more aspects in a simplified form as a prelude to the more detailed description of the disclosure that follows. To the accomplishment of the foregoing, the one or more aspects of the present disclosure include the features described and exemplarily pointed out in the claims.

BRIEF DESCRIPTION OF THE DRAWINGS

The accompanying drawings, which are incorporated into and constitute a part of this specification, illustrate one or more example aspects of the present disclosure and, together with the detailed description, serve to explain their principles and implementations.

DETAILED DESCRIPTION

Exemplary aspects are described herein in the context of a system, method, and computer program product for automated malicious code replacement. Those of ordinary skill in the art will realize that the following description is illustrative only and is not intended to be in any way limiting. Other aspects will readily suggest themselves to those skilled in the art having the benefit of this disclosure. Reference will now be made in detail to implementations of the example aspects as illustrated in the accompanying drawings. The same reference indicators will be used to the extent possible throughout the drawings and the following description to refer to the same or like items.

As mentioned previously, instead of removal, malicious code injection can be transformed into a benign fragment. This significantly reduces the number of syntax errors after cleanup (especially automated), causes less disruption to end-user activity, and in some cases allows to generate honeypots as an additional bonus. Such a soft cleanup approach can be implemented by replacing the injected code instead of just removing the injection. Ideally, any replacement code should be compatible with the surrounding code in terms of syntax and programming code logic level. The present disclosure describes an automated approach, where detection and replacement patterns/signatures are part of a template database that is bundled together with an anti-malware security solution for malware cleanup. The user is not required to do anything except, in some aspects, define the events which will cause the scanner to run (e.g., certain time or action, like file upload) or run the scanner through manual selection.

Figure 1:
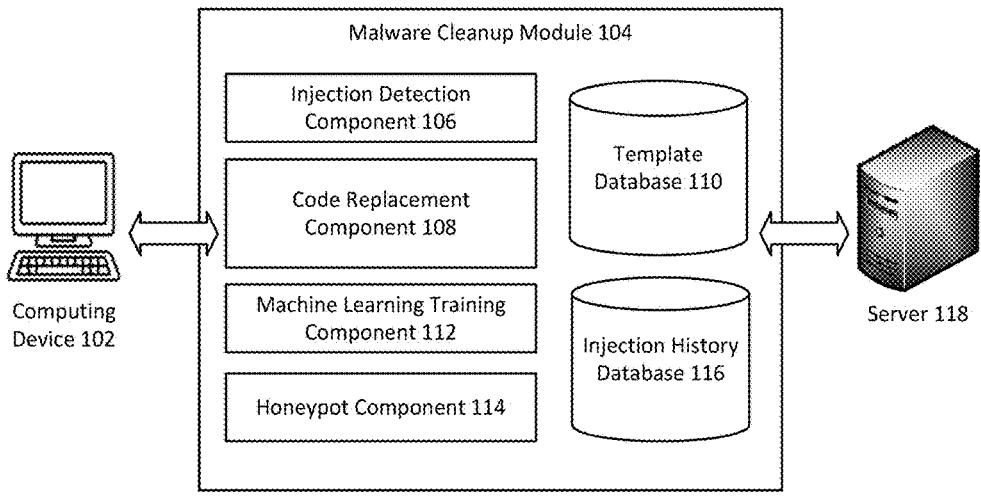
FIG. 1 is a block diagram illustrating a system for automated malicious code replacement.

FIG. 1 is a block diagram 100 illustrating a system for automated malicious code replacement. Malware cleanup module 104, which may be configured to detect and replace malware injections with benign code, may be stored in the memory of computing device 102 and/or server 118 and executed by one of their processors. In some aspects, malware cleanup module 104 is a part of an anti-malware or an anti-virus application. In other aspects, malware cleanup module 104 is a standalone security application. Computing device 102 and server 118 are computer systems described further in FIG. 5. Server 118 may be a remote server connected to computing device 102 via a network (e.g., the Internet). In some aspects, malware cleanup module 104 is split into a thin and thick client application set, where the thin client application is installed on computing device 102 and the thick client application is installed on server 118. The thin client application may send files on computing device 102 to server 118 for analysis by the thick client application, and may output results of the analysis on computing device 102.

Malware cleanup module 104 includes injection detection component 106, which detects portions of a file that may be malicious injections, code replacement component 108, which replaces the detected portion with benign code, and template database 110, which includes injection patterns/signatures to detect and the corresponding benign code that should replace the injection pattern/signature.

In some aspects, injection detection component 106 and code replacement component 108 are part of a machine learning algorithm trained by machine learning training component 112. In particular the machine learning algorithm may be a trained on a dataset comprising exemplary files with labelled injections and the proper benign replacement code for the labelled injection. Machine learning training component 112 may update the weights associated with the classification of the injection and selection of the replacement. In some aspects, there are two machine learning algorithms trained by component 112—one for classifying injection presence in a script (where the training dataset comprises a plurality of scripts and labelled injections in the scripts) and one for selecting the replacement code (where the training dataset comprises a plurality of injection code operators and a version of the resolved code with the benign operators).

Depending on which specific operators are replaced, the machine learning algorithm can identify the main operator that is the trigger or primary actor in the malicious activity. The machine learning algorithm may also be used to select the main operator (i.e., the machine learning algorithm may be trained to detect main operators of malware injections inside scripts and replace the main operators with replacement operators). In this case, the training dataset for the machine learning algorithm would also include a plurality of scripts with labelled main operators and successful replacement operators (i.e., operators that prevent the malicious activity and do not cause system errors) for the labelled main operators.

Malware cleanup module 104 may also include honeypot component 114, which marks an updated file (where an injection has successfully been replaced) as a honeypot and monitors activity associated with the file. All associated activity may be stored by honeypot component 114 in injection history database 116.

Figure 2:
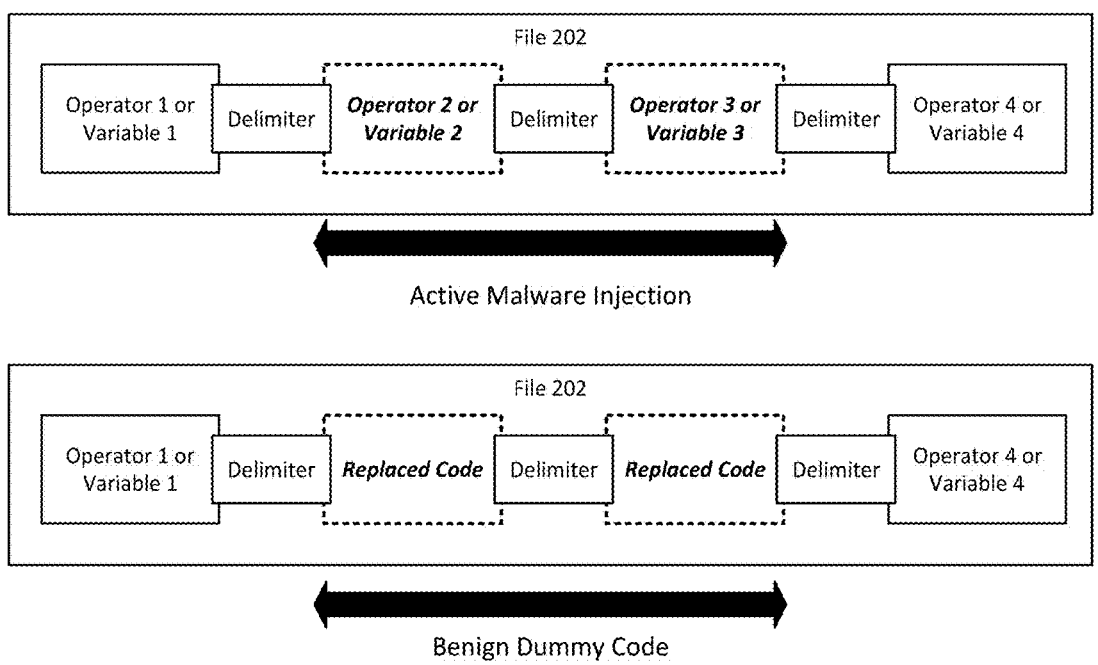
FIG. 2 is a block diagram illustrating a replacement of malicious injection code with benign dummy code.

FIG. 2 is a block diagram 200 illustrating a replacement of malicious injection code with benign dummy code. On a high-level, a syntax safe code replacement approach can be described by the schema shown in diagram 200 where an active malware injection is modified, which leads to the deactivation of the malware code (i.e., it becomes benign). More specifically, malware cleanup module 104 may scan file 202 and injection detection component 106 may detect an active malware injection in operator 2 and operator 3 based on a similar pattern/signature listed in template database 110. Code replacement component 108 may replace the code with benign dummy code that is listed as the corresponding replacement code in template database 110.

Consider the following detailed example of an active PHP malware injection and its corresponding replacement code:

Injection

@eval (base64_decode (str_rot13 (strrev (base64_decode (str_rot13 ($_POST['c'])))));

Replacement

@trim (base64_decode (str_rot13 (strrev (base64_decode (str_rot13 ($_POST['c'])))));

In the PHP programming language, "$_POST" is an associative array of variables passed to the current script via the HTTP POST method (e.g., through the Internet from some remote host). By adding this code injection into a PHP script (e.g., file 202), a hacker creates a backdoor, which is an unauthorized means to execute remote code. The code execution itself is triggered by the PHP operator "eval" (derives from word evaluate). "eval" can potentially be a dangerous operator because it blindly tries to execute any type of code it receives as an input parameter. Injection detection component 106 may detect the combination of "eval" and "$_POST" as an "eval" input parameter and determine that the combination is present in template database 110 as a malicious injection. In response to the detection, code replacement component 108 replaces "eval" with "trim," which is another PHP operator that returns a string with whitespace stripped from the beginning and end of the passed string. More importantly, "trim" does not lead to code execution. By replacing the dangerous trigger code in the injection "eval" with the safe operator "trim," malware cleanup module 104 prevents malware code execution and the malware code injection is deactivated (i.e., cannot be used for its intended purpose).

It should be noted that in the example above, the operator or delimiter standing before "eval" can be different. For example, instead of "@", it can be ";" (semicolon), "}" (closing curly bracket), ":" (colon), an empty space, or other operators appropriate to the syntax and programming language version used. For example, the operator can also be a non-PHP operator if the injection is in a script written in a different programming language. It is often difficult to predict where the malware injection will be inserted into the legitimate PHP code and what operators will stand before it. However, if the operator or delimiter (e.g., "@") is left without the code that followed after, a syntax error will occur. In that case, the execution will not work and other files that depend on file 202 will fail as well. This may cause an application crash, which may be equally as damaging as letting the injection execute (depending on the file that was injected).

In general, code replacement component 108 is configured to take a syntax-safe code replacement approach. This approach generally involves replacement of at least the main trigger operator with a benign equivalent that can accept the same arguments as input and be placed at the same place in the code, but will not produce any 3$^{rd}$-party code execution as well as syntax or logic errors (like division by zero). Such type of code replacement can be applied to any interpretable programming language including PHP, Python, Perl, JavaScript, etc.

In some aspects, if the file with the malicious code injection is executed at the server-side by a web server (e.g., server 118), malware cleanup module 104 may additionally enable changing the logic of the malicious code to not only make it benign, but allow it to be a honeypot on a live\production system that will generate a confirmation for an attacker that a malicious action was successful when in fact is has been blocked. Such an approach gives an additional way of tracking remote attacker data such as IP addresses, web-browser user agents, payloads submitted, etc.

Consider another example of a malicious backdoor uploader:

```
<?php if (@copy($_FILES["f"]["tmp_name"], $_FILES["f"]["name"]))
{
    echo "<b>berhasil</b> --". $_FILES["f"]["name"];
}
else
{
    echo "<b>Gagal ~_~</b>";
}?>
```

In the above example, if the remote file has been successfully dropped on the file system (e.g., of computing device 102 or server 118), the script response will contain the word "berhasil." If upload failed, the response will contain the word "Gagal." If the injection has been completely removed, there will be an empty response or error message. In order to convince the attackers that the operation was successfully completed, the code has to be modified in the way that the execution will still output a response containing the word "berhasil," but will not actually do anything. The "dangerous" function in the example above is "copy," which is a PHP function that allows remote attackers to upload their files to the website. The cleanup approach will be the same as the one described previously.

In particular, code replacement component 108 may replace "copy" with "array," as shown below:

```
<?php if (@array($_FILES["f"]["tmp_name"], $_FILES["f"]["name"]))
{
    echo "<b>berhasil</b>--" . $_FILES["f"]["name"];
}
else
{
    echo "<b>Gagal ~_~</b>";
}?>
```

The "array" function in PHP returns an array of arguments provided, without performing any kind of actions on them like code execution or uploading on the file system. Here, replacement of the "dangerous" operator occurs inside the conditional operator (i.e., "if/else"), which leads to the emulation of successful completion of the upload operation when in reality, the upload does not take place. In other words, the injection is transformed into a honeypot, which produces similar answers to the attacker queries (e.g., "berhasil") without actually causing any harm to the system.

Honeypot component 114 may work on the programming language interpreter level and may intercept and analyze incoming requests and\or responses produced by the honeypot file (i.e., the cleaned script). Accordingly, honeypot component 114 may monitor the interaction between the honeypot file and the attacker and record data associated with the interaction in logs such as web-server logs and outgoing web application firewall logs. These logs may be stored in injection history database 116. The presence of honeypot component 114 creates a complete honeypot infrastructure with the ability to attract attackers, track them, and in some cases even identify them. For example, honeypot component 114 may store, for each malware injection, logs of executed operators, replaced operators, web server argument arrays (e.g., GET, POST, COOKIE, SESSION, SERVER, REQUEST) for HTTP sessions and their payloads. In some aspects, honeypot component 114 may further store attacker IP addresses in injection history database 116 alongside other identifying network and web request parameters.

The information stored in injection history database 116 may be useful to generate blacklists and injection/replacement operator templates for other computing devices that are connected to server 118. Thus, a novel attack on computing device 102 that is successfully identified by the honeypot in computing device 102 may be completely blocked on a different computing device unrelated to computing device 102 (e.g., by blocking uploads from the IP address in the blacklist).

Figure 3:
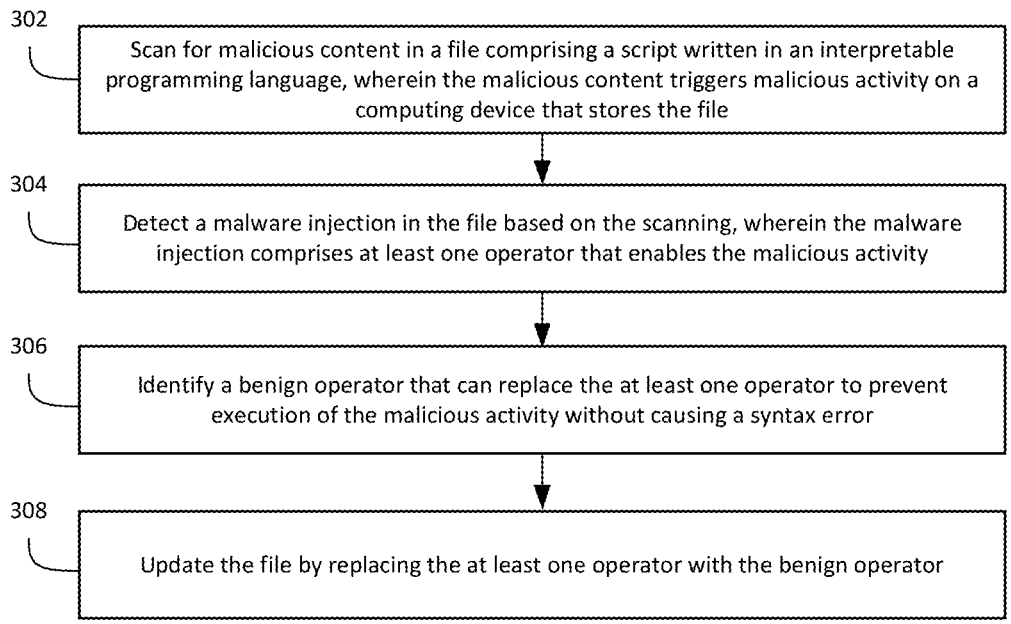
FIG. 3 illustrates a flow diagram of method 300 for automated malicious code replacement.

FIG. 3 illustrates a flow diagram of method 300 for automated malicious code replacement. At 302, malware cleanup module 104 scans for malicious content (e.g., operator 2 and operator 3 in FIG. 2) in a file (e.g., file 202) comprising a script written in an interpretable programming language (e.g., PHP). The malicious content in this case triggers malicious activity on a computing device (e.g., computing device 102) that stores the file.

At 304, injection detection component 106 detects a malware injection (e.g., the active malware injection in FIG. 2) in the file based on the scanning. The malware injection comprises at least one operator that enables the malicious activity (e.g., operator 2 and/or operator 3). At 306, code replacement component 108 identifies a benign operator that can replace the at least one operator to prevent execution of the malicious activity without causing a syntax error. In some aspects, this involves referring to templates of injection operators and their corresponding replacement benign operators.

In some aspects, template database 110 is organized as a plurality of rules that indicate which replacement benign operator should replace a dangerous operator. Accordingly, code replacement component 108 selects the benign operator based on a rule of a plurality of rules that indicate replacement operators of dangerous operators, wherein the at least one operator is a dangerous operator. In some cases, the rules are structured as "if/else" statements (i.e., if [operator] detected, replace with [replacement operator], else keep as is).

It should be noted that the malware injection may include a combination of operators, but not all operators need to be changed to render the injection deactivated. There may be one or more main operators that cause the actual damage or data theft on the computing device. Template database 110 may be organized such that if a pattern or combination of operators and variables is detected, a replacement for that pattern is prescribed (e.g., if [operator 1, operator 2, operator 3, operator 4] is detected, replace with [operator 1, replacement operator A, replacement operator B, operator 4]).

At 308, code replacement component 108 updates the file by replacing the at least one operator with the benign operator. For example, the text in the script is edited and the file is saved in the memory of the computing device—overwriting the previous version of the file.

Figure 4:
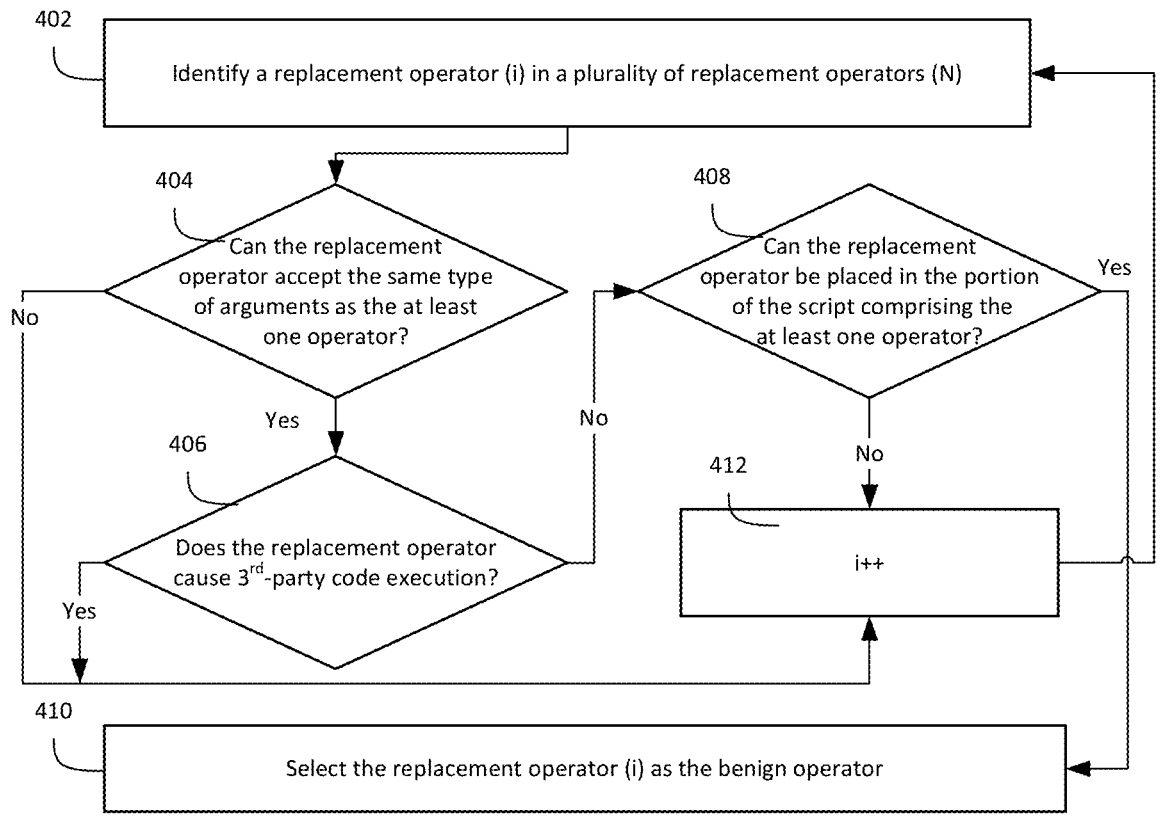
FIG. 4 illustrates a flow diagram of method 400 for selecting a replacement operator as the benign operator.

FIG. 4 illustrates a flow diagram of method 400 for selecting a replacement operator as the benign operator. As described previously, malware cleanup module 104 may rely on a template database 110 to determine how to replace malicious code with benign dummy code. For example, code replacement component 108 may search template database 110 for a template of the malware injection detected in the file (e.g., file 202), wherein the template is a pattern comprising a sequence of operators and delimiters (e.g., operator 2 followed by a delimiter and operator 3 as shown in FIG. 2), and wherein the template database maps each malware injection template to benign code comprising replacement operators for the malware injection template (e.g., the replaced code shown in FIG. 2). Subsequent to identifying the template of the malware injection in the template database, code replacement component 108 may select an associated replacement operator of the template as the benign operator.

However, there may be a case where the combination of operators and delimiters does not have a known template that can be readily identified and replaced with a benign template of replacement operators. In this case, malware cleanup module 104 may recognize that the combination of operators are potentially dangerous, but not have a reference for plugging. Method 400 describes a brute force approach to replacing potentially dangerous operators with replacement operators that will not execute or trigger malicious activity and will not cause a syntax error either.

At 402, code replacement component 108 identifies a replacement operator (i) in a plurality of replacement operators (N). Suppose that the operator in the malware injection is "eval." A first replacement operator in the plurality of replacement operators may be "array." Another replacement operator may be "trim." At 404, code replacement component 108 determines if the replacement operator "eval" can accept the same type of arguments as the at least one operator (i.e., "eval"). If the replacement operator cannot, method 400 advances to 412, where (i) is iterated and then returns to 402 where the next replacement operator is selected (e.g., "trim").

Blocks 404, 406, and 408 represent criteria of the replacement operator and may be queried in any order. If a criterion is not met, the next replacement operator in the plurality of replacement operators is considered. If all criteria are met by a replacement operator, method 400 advances to 410, where code replacement component 108 selects that replacement operator as the benign operator.

For example, at 406, code replacement component 108 determines whether replacement operator (i) causes $3^{rd}$ party code execution. At 408, code replacement component 108 determines whether the replacement operator (i) can be placed in the portion of the script where the at least one operator of the malware injection is present. A benign operator will accept arguments of a same type as arguments accepted by the at least one operator, can be placed in a portion of the script where the at least one operator is placed, and does not cause $3^{rd}$-party code execution.

Subsequent to replacing an operator of the active malware injection with a replacement operator, malware cleanup module 104 may monitor the execution of the script. If the script's execution is successful without errors and no malware is detected (e.g., by an anti-virus software) within a threshold period of time (e.g., 30 minutes) from execution, malware cleanup module 104 may generate a new template in template database 110 that indicates the replacement of the particular operator with the particular replacement operator. The update template database 110 may then be uploaded to server 118, which can update local template databases on other computing devices connected to server 118.

In the event that malware is detected or an error occurs, malware cleanup module 104 may generate an indication not to replace the particular operator with the particular replacement operator in that malware injection. This data may be used by machine learning training component 112 to train the machine learning algorithm comprising injection detection component 106 and/or code replacement component 108. Likewise, if the machine learning algorithm were to misplace an operator such that execution of the script leads to triggering of the malicious activity or an error on the computing device, machine learning training component 112 may re-train the machine learning algorithm to avoid the misplacement in the future.

Figure 5:
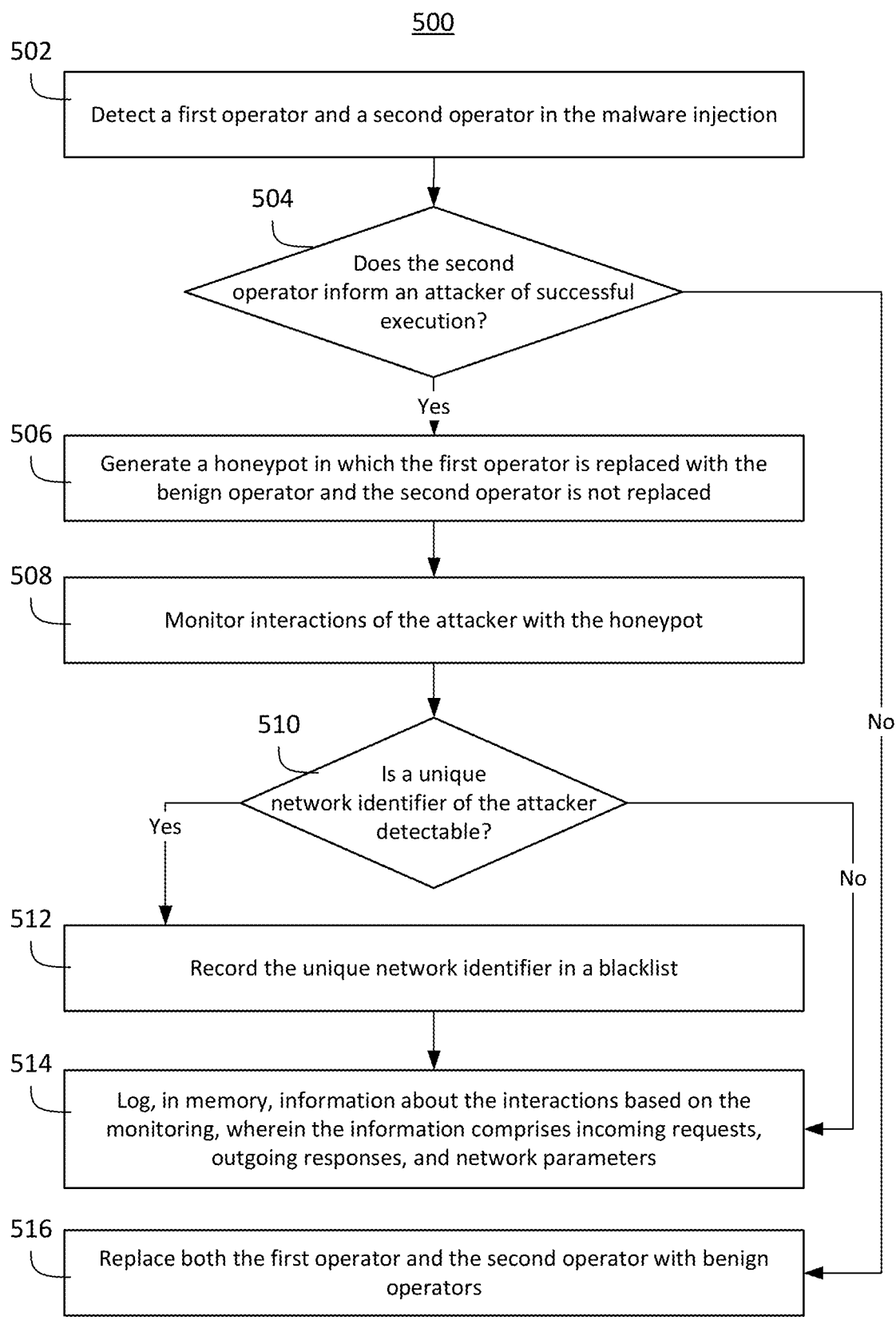
FIG. 5 illustrates a flow diagram of method 500 for generating a honeypot.

FIG. 5 illustrates a flow diagram of method 500 for generating a honeypot. At 502, injection detection component 106 detects a first operator (e.g., "copy") and a second operator (e.g., "echo") in the malware injection. At 504, injection detection component 106 determines whether the second operator informs an attacker of successful execution. Here, injection detection component 106 may look for specific operators that transmit or output data to a user. "Echo" is an example of such an operator. In response to determining that the second operator does not inform an attacker of successful execution, method 500 advances to 516, where code replacement component 108 replaces both the first operator and the second operator with benign operators. For example, both operators may be "copy" and are replaced with the operator "array."

However, if injection detection component 106 determines that the second operator does in fact inform an attacker of successful execution (e.g., outputs "berhasil" as described in a previous example), method 500 advances to 506, where code replacement component 108 generates a honeypot in which the first operator is replaced with the benign operator (e.g., "array") and the second operator is not replaced. At 508, honeypot component 114 monitors interactions of the attacker with the honeypot. At 510, honeypot component 114 determines whether a unique network identifier of the attacker is detectable (e.g., such as an IP address or a MAC address). If such a network identifier is detectable, method 500 advances to 512, where honeypot component 114 records the unique network identifier in a blacklist. From 512, method 500 advances to 514, where honeypot component 114 continues to log, in memory, information (e.g., incoming requests, outgoing responses, and network parameters) about the interactions as detected during the monitoring. This information may be useful to a forensics investigator or a machine learning algorithm that learns about malware attacks. If at 510, honeypot component 114 cannot detect a unique network identifier, method 500 skips 512 and advances directly to 514.

Figure 6:
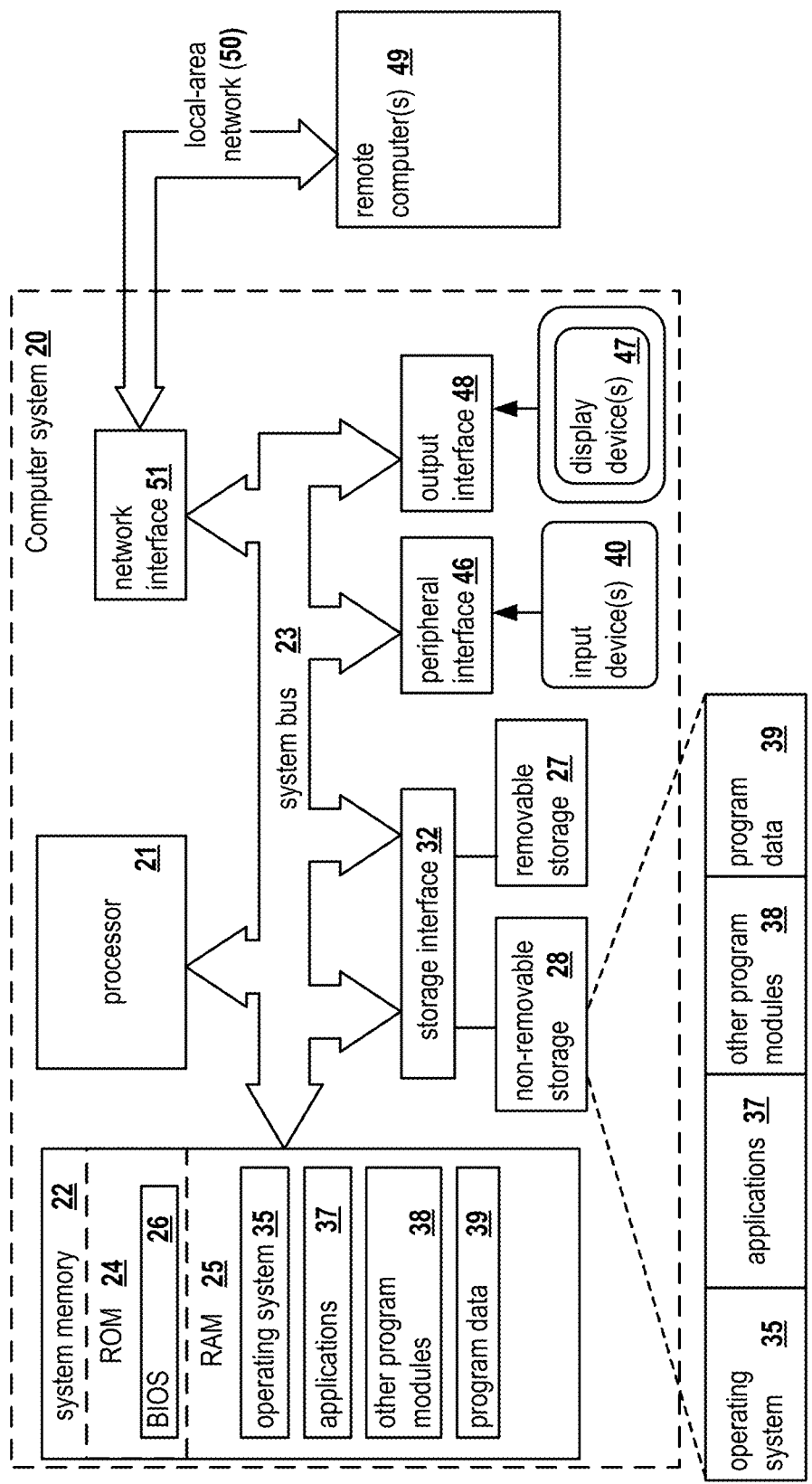
FIG. 6 presents an example of a general-purpose computer system on which aspects of the present disclosure can be implemented.

FIG. 6 is a block diagram illustrating a computer system 20 on which aspects of systems and methods for automated malicious code replacement may be implemented in accordance with an exemplary aspect. The computer system 20 can be in the form of multiple computing devices, or in the form of a single computing device, for example, a desktop computer, a notebook computer, a laptop computer, a mobile computing device, a smart phone, a tablet computer, a server, a mainframe, an embedded device, and other forms of computing devices.

As shown, the computer system 20 includes a central processing unit (CPU) 21, a system memory 22, and a system bus 23 connecting the various system components, including the memory associated with the central processing unit 21. The system bus 23 may comprise a bus memory or bus memory controller, a peripheral bus, and a local bus that is able to interact with any other bus architecture. Examples of the buses may include PCI, ISA, PCI-Express, Hyper-Transport™, InfiniBand™, Serial ATA, I²C, and other suitable interconnects. The central processing unit 21 (also referred to as a processor) can include a single or multiple sets of processors having single or multiple cores. The processor 21 may execute one or more computer-executable code implementing the techniques of the present disclosure. For example, any of commands/steps discussed in FIGS. 1-5 may be performed by processor 21. The system memory 22 may be any memory for storing data used herein and/or computer programs that are executable by the processor 21. The system memory 22 may include volatile memory such as a random access memory (RAM) 25 and non-volatile memory such as a read only memory (ROM) 24, flash memory, etc., or any combination thereof. The basic input/output system (BIOS) 26 may store the basic procedures for transfer of information between elements of the computer system 20, such as those at the time of loading the operating system with the use of the ROM 24.

The computer system 20 may include one or more storage devices such as one or more removable storage devices 27, one or more non-removable storage devices 28, or a combination thereof. The one or more removable storage devices 27 and non-removable storage devices 28 are connected to the system bus 23 via a storage interface 32. In an aspect, the storage devices and the corresponding computer-readable storage media are power-independent modules for the storage of computer instructions, data structures, program modules, and other data of the computer system 20. The system memory 22, removable storage devices 27, and non-removable storage devices 28 may use a variety of computer-readable storage media. Examples of computer-readable storage media include machine memory such as cache, SRAM, DRAM, zero capacitor RAM, twin transistor RAM, eDRAM, EDO RAM, DDR RAM, EEPROM, NRAM, RRAM, SONOS, PRAM; flash memory or other memory technology such as in solid state drives (SSDs) or flash drives; magnetic cassettes, magnetic tape, and magnetic disk storage such as in hard disk drives or floppy disks; optical storage such as in compact disks (CD-ROM) or digital versatile disks (DVDs); and any other medium which may be used to store the desired data and which can be accessed by the computer system 20.

The system memory 22, removable storage devices 27, and non-removable storage devices 28 of the computer system 20 may be used to store an operating system 35, additional program applications 37, other program modules 38, and program data 39. The computer system 20 may include a peripheral interface 46 for communicating data from input devices 40, such as a keyboard, mouse, stylus, game controller, voice input device, touch input device, or other peripheral devices, such as a printer or scanner via one or more I/O ports, such as a serial port, a parallel port, a universal serial bus (USB), or other peripheral interface. A display device 47 such as one or more monitors, projectors, or integrated display, may also be connected to the system bus 23 across an output interface 48, such as a video adapter. In addition to the display devices 47, the computer system 20 may be equipped with other peripheral output devices (not shown), such as loudspeakers and other audiovisual devices.

The computer system 20 may operate in a network environment, using a network connection to one or more remote computers 49. The remote computer (or computers) 49 may be local computer workstations or servers comprising most or all of the aforementioned elements in describing the nature of a computer system 20. Other devices may also be present in the computer network, such as, but not limited to, routers, network stations, peer devices or other network nodes. The computer system 20 may include one or more network interfaces 51 or network adapters for communicating with the remote computers 49 via one or more networks such as a local-area computer network (LAN) 50, a wide-area computer network (WAN), an intranet, and the Internet. Examples of the network interface 51 may include an Ethernet interface, a Frame Relay interface, SONET interface, and wireless interfaces.

Aspects of the present disclosure may be a system, a method, and/or a computer program product. The computer program product may include a computer readable storage medium (or media) having computer readable program instructions thereon for causing a processor to carry out aspects of the present disclosure.

The computer readable storage medium can be a tangible device that can retain and store program code in the form of instructions or data structures that can be accessed by a processor of a computing device, such as the computing system 20. The computer readable storage medium may be an electronic storage device, a magnetic storage device, an optical storage device, an electromagnetic storage device, a semiconductor storage device, or any suitable combination thereof. By way of example, such computer-readable storage medium can comprise a random access memory (RAM), a read-only memory (ROM), EEPROM, a portable compact disc read-only memory (CD-ROM), a digital versatile disk (DVD), flash memory, a hard disk, a portable computer diskette, a memory stick, a floppy disk, or even a mechanically encoded device such as punch-cards or raised structures in a groove having instructions recorded thereon. As used herein, a computer readable storage medium is not to be construed as being transitory signals per se, such as radio waves or other freely propagating electromagnetic waves, electromagnetic waves propagating through a waveguide or transmission media, or electrical signals transmitted through a wire.

Computer readable program instructions described herein can be downloaded to respective computing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network interface in each computing device receives computer readable program instructions from the network and forwards the computer readable program instructions for storage in a computer readable storage medium within the respective computing device.

Computer readable program instructions for carrying out operations of the present disclosure may be assembly instructions, instruction-set-architecture (ISA) instructions, machine instructions, machine dependent instructions, microcode, firmware instructions, state-setting data, or either source code or object code written in any combination of one or more programming languages, including an object oriented programming language, and conventional procedural programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a LAN or WAN, or the connection may be made to an external computer (for example, through the Internet). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present disclosure.

In various aspects, the systems and methods described in the present disclosure can be addressed in terms of modules. The term "module" as used herein refers to a real-world device, component, or arrangement of components implemented using hardware, such as by an application specific integrated circuit (ASIC) or FPGA, for example, or as a combination of hardware and software, such as by a microprocessor system and a set of instructions to implement the module's functionality, which (while being executed) transform the microprocessor system into a special-purpose device. A module may also be implemented as a combination of the two, with certain functions facilitated by hardware alone, and other functions facilitated by a combination of hardware and software. In certain implementations, at least a portion, and in some cases, all, of a module may be executed on the processor of a computer system. Accordingly, each module may be realized in a variety of suitable configurations, and should not be limited to any particular implementation exemplified herein.

In the interest of clarity, not all of the routine features of the aspects are disclosed herein. It would be appreciated that in the development of any actual implementation of the present disclosure, numerous implementation-specific decisions must be made in order to achieve the developer's specific goals, and these specific goals will vary for different implementations and different developers. It is understood that such a development effort might be complex and time-consuming, but would nevertheless be a routine undertaking of engineering for those of ordinary skill in the art, having the benefit of this disclosure.

Furthermore, it is to be understood that the phraseology or terminology used herein is for the purpose of description and not of restriction, such that the terminology or phraseology of the present specification is to be interpreted by the skilled in the art in light of the teachings and guidance presented herein, in combination with the knowledge of those skilled in the relevant art(s). Moreover, it is not intended for any term in the specification or claims to be ascribed an uncommon or special meaning unless explicitly set forth as such.

The various aspects disclosed herein encompass present and future known equivalents to the known modules referred to herein by way of illustration. Moreover, while aspects and applications have been shown and described, it would be apparent to those skilled in the art having the benefit of this disclosure that many more modifications than mentioned above are possible without departing from the inventive concepts disclosed herein.

The invention claimed is:

1. A method for automated malicious code replacement, the method comprising:
analyzing, using a trained machine learning (ML) algorithm for identifying malicious content, a file comprising a script written in an interpretable programming language, wherein the malicious content triggers malicious activity on a computing device that stores the file, and wherein a training dataset for the ML algorithm includes a plurality of scripts and labelled malware injections in the scripts;
detecting a malware injection in the file based on the ML analysis, wherein the malware injection comprises at least one code fragment that enables the malicious activity, and identifying at least one malicious activity trigger operator in the code fragment;
selecting, using a trained ML algorithm for selecting a replacement code, a benign code fragment that can replace the at least one code fragment to prevent execution of the malicious activity without causing a syntax error, wherein the benign code fragment includes a benign operator that accepts the same inputs as the malicious activity trigger operator, and wherein a training dataset for the ML algorithm includes a plurality of malicious activity operators and corresponding benign code fragments with the benign operators; and
updating the file by replacing at least the malicious activity trigger operator in the at least one code fragment with the selected benign code fragment.

2. The method of claim 1, wherein selecting the benign code fragment comprises selecting the benign code fragment that (1) accepts arguments of a same type as arguments accepted by the at least one code fragment, (2) can be placed in a portion of the script where the at least one code fragment is placed, and (3) does not cause $3^{rd}$-party code execution.

3. The method of claim 1, wherein selecting the benign code fragment further comprises:
searching a template database for a template of the malware injection detected in the file, wherein the template is a pattern comprising a sequence of operators and delimiters, and wherein the template database maps each malware injection template to benign code comprising replacement operators for the malware injection template;
identifying the template of the malware injection in the template database; and
selecting an associated replacement operator of the template as the benign code fragment.

4. The method of claim 1, wherein selecting the benign code fragment further comprises:
selecting the benign code fragment based on a rule of a plurality of rules that indicate replacement operators of dangerous operators, wherein the at least one code fragment is a dangerous operator.

5. The method of claim 1, further comprising:
selecting, from the at least one code fragment, a main operator that triggers the malware injection, wherein the benign code fragment replaces the main operator.

6. The method of claim 5, wherein selecting the main operator comprises executing a machine learning algorithm that is trained to detect main operators of malware injections inside scripts and replace the main operators with replacement operators, wherein a training dataset for the machine learning algorithm comprises a plurality of scripts with labelled injections and successful replacement code for the labelled injections.

7. The method of claim 1, wherein the at least one code fragment comprises a first code fragment that triggers the malicious activity and a second code fragment that informs an attacker that the malicious activity was successfully triggered, wherein updating the file comprises:
generating a honeypot by replacing the first code fragment with the benign code fragment and not replacing the second code fragment.

8. The method of claim 7, further comprising:
monitoring interactions of the attacker with the honeypot;
logging, in memory, information about the interactions based on the monitoring, wherein the information comprises incoming requests, outgoing responses, and network parameters.

9. The method of claim 8, further comprising:
detecting an IP address of the attacker based on the monitoring; and
recording the IP address in a blacklist.

10. A system for automated malicious code replacement, comprising:
a memory; and
a hardware processor communicatively coupled with the memory and configured to:
analyze, using a trained machine learning (ML) algorithm for identifying malicious content, a file comprising a script written in an interpretable programming language, wherein the malicious content triggers malicious activity on a computing device that stores the file, and wherein a training dataset for the ML algorithm includes a plurality of scripts and labelled malware injections in the scripts;
detect a malware injection in the file based on the ML analysis, wherein the malware injection comprises at least one code fragment that enables the malicious activity, and identifying at least one malicious activity trigger operator in the code fragment;
select, using a trained ML algorithm for selecting a replacement code, a benign code fragment that can replace the at least one code fragment to prevent execution of the malicious activity without causing a syntax error, wherein the benign code fragment includes a benign operator that accepts the same inputs as the malicious activity trigger operator, and wherein a training dataset for the ML algorithm includes a plurality of malicious activity operators and corresponding benign code fragments with the benign operators; and
update the file by replacing at least the malicious activity trigger operator in the at least one code fragment with the selected benign code fragment.

11. The system of claim 10, wherein the hardware processor is configured to select the benign code fragment by selecting a code fragment as the benign code fragment that (1) accepts arguments of a same type as arguments accepted by the at least one code fragment, (2) can be placed in a portion of the script where the at least one code fragment is placed, and (3) does not cause $3^{rd}$-party code execution.

12. The system of claim 10, wherein the hardware processor is configured to select the benign code fragment by:
searching a template database for a template of the malware injection detected in the file, wherein the template is a pattern comprising a sequence of operators and delimiters, and wherein the template database maps each malware injection template to benign code comprising replacement operators for the malware injection template;
identifying the template of the malware injection in the template database; and
selecting an associated replacement operator of the template as the benign code fragment.

13. The system of claim 10, wherein the hardware processor is configured to select the benign code fragment by:
selecting the benign code fragment based on a rule of a plurality of rules that indicate replacement operators of dangerous operators, wherein the at least one code fragment is a dangerous operator.

14. The system of claim 10, wherein the hardware processor is configured to:
select, from the at least one code fragment, a main operator that triggers the malware injection, wherein the benign code fragment replaces the main operator.

15. The system of claim 14, wherein the hardware processor is configured to select the main operator by executing a machine learning algorithm that is trained to detect main operators of malware injections inside scripts and replace the main operators with replacement operators, wherein a training dataset for the machine learning algorithm comprises a plurality of scripts with labelled injections and successful replacement code for the labelled injections.

16. The system of claim 10, wherein the at least one code fragment comprises a first code fragment that triggers the malicious activity and a second code fragment that informs an attacker that the malicious activity was successfully triggered, wherein the hardware processor is configured to update the file by:

generating a honeypot by replacing the first code fragment with the benign code fragment and not replacing the second code fragment.

17. The system of claim 16, wherein the hardware processor is configured to:

monitor interactions of the attacker with the honeypot;

log, in the memory, information about the interactions based on the monitoring, wherein the information comprises incoming requests, outgoing responses, and network parameters.

18. The system of claim 17, wherein the hardware processor is configured to:

detect an IP address of the attacker based on the monitoring; and record the IP address in a blacklist.

19. A non-transitory computer readable medium storing thereon computer executable instructions for automated malicious code replacement, including instructions for:

analyzing, using a trained machine learning (ML) algorithm for identifying malicious content, a file comprising a script written in an interpretable programming language, wherein the malicious content triggers malicious activity on a computing device that stores the file, and wherein a training dataset for the ML algorithm includes a plurality of scripts and labelled malware injections in the scripts;

detecting a malware injection in the file based on the ML analysis, wherein the malware injection comprises at least one code fragment that enables the malicious activity, and identifying at least one malicious activity trigger operator in the code fragment;

selecting, using a trained ML algorithm for selecting a replacement code, a benign code fragment that can replace the at least one code fragment to prevent execution of the malicious activity without causing a syntax error, wherein the benign code fragment includes a benign operator that accepts the same inputs as the malicious activity trigger operator, and wherein a training dataset for the ML algorithm includes a plurality of malicious activity operators and corresponding benign code fragments with the benign operators; and updating the file by replacing at least the malicious activity trigger operator in the at least one code fragment with the selected benign code fragment.

* * * * *